United States Patent [19]

D'Albignac et al.

[11] 3,807,949

[45] Apr. 30, 1974

[54] PROCESS FOR DYEING BASIC FIBRES

[75] Inventors: Jean Marie Louis Jules D'Albignac, Creil; Serge Etienne Eugène Riassetto, Lauterbourg, both of France

[73] Assignee: Societe Civile Soltex, Paris, France

[22] Filed: June 24, 1971

[21] Appl. No.: 156,507

[30] Foreign Application Priority Data
July 1, 1970  France.............................. 70.24325

[52] U.S. Cl.............................. 8/169, 8/174, 8/172
[51] Int. Cl............................................. D06p 5/06
[58] Field of Search.......... 8/172, 85, 174, 175, 169

[56] References Cited
UNITED STATES PATENTS

| | | | |
|---|---|---|---|
| 2,828,180 | 3/1958 | Sertorio | 8/62 |
| 3,112,983 | 12/1963 | Collins | 8/93 X |

FOREIGN PATENTS OR APPLICATIONS

| | | | |
|---|---|---|---|
| 513,918 | 10/1939 | Great Britain | 8/84 |
| 856,381 | 12/1960 | Great Britain | 8/54 |
| 1,560,532 | 2/1969 | France | 8/94 |
| 2,019,321 | 7/1970 | France | 8/94 |
| 2,032,391 | 2/1970 | France | 8/94 |
| 2,054,532 | 4/1971 | France | 8/94 |

OTHER PUBLICATIONS

White, American Dyestuff Reporter, July 31, 1967, pages 18–24.

*Primary Examiner*—Donald Levy
*Attorney, Agent, or Firm*—Browne, Beveridge, DeGrandi & Kline

[57] ABSTRACT

Emulsion for dyeing in an open bath comprising a coloured hydrophilic phase containing one or more anionic dyestuffs in a dissociated state and a coloured lipophilic phase containing the same anionic dyestuff or dyestuffs associated in the form of a salt, with a fat-soluble organic base containing at least 10 carbon atoms, the lipophilic phase comprising from 50 to 99 percent of the emulsion and the molar ratio of the fat-soluble organic base with respect to the dyestuff being between 0.1 and 5. The emulsion may be prepared by mixing a solution of a fat-soluble organic base containing at least 10 carbon atoms in a lipophilic solvent with a concentrated aqueous or aqueous-alcoholic solution of an anionic dyestuff and the mixture obtained acidified, the molar ratio of the acid with respect to the dyestuff being between 0 and 5 or by mixing a lipophilic solvent with an aqueous or aqueous-alcoholic solution of an anionic dyestuff and an aqueous solution of a mineral or organic salt of a fat-soluble base containing at least 10 carbon atoms. The emulsion is suitable for dyeing basic fibres in an open bath for example, by a process wherein the fibres are treated with an emulsion comprising a coloured hydrophilic phase containing one or more anionic dyestuffs in a dissociated state and a coloured lipophilic phase containing the same anionic dyestuff of dyestuffs, associated in the form of a salt, with an organic fat-soluble base containing at least 10 carbon atoms, the dyeing being effected on raising the temperature, by progressive exhaustion of the lipophilic phase and of the hydrophilic phase.

1 Claim, No Drawings

PROCESS FOR DYEING BASIC FIBRES

The present invention concerns a process for dyeing basic fibres.

The dyeing of basic fibres in a solvent medium by exhaustion of the bath is generally effected using as the principal solvent a halogenated hydrocarbon, most frequently a chlorinated hydrocarbon such as trichloroethylene and especially perchloroethylene.

For dyeing with conventional anionic dyestuffs which are insoluble in such a medium, various methods have been suggested as follows:

a. emulsion of concentrated aqueous solutions of these dyestuffs in the halogenated hydrocarbon by means of suitable emulsifiers (French Pat. No. 1,535,352), b. emulsion of concentrated water-alcohol solutions of these dyestuffs in the halogenated hydrocarbon (U.S. Pat. application Ser. No. 18,341 of March 10, 1970 or c. addition of alcohols (U.S. Pat. application Ser. No. 33,094 of April 29, 1970, now abandoned, which application corresponds to French Pat. No. 2,054,430.) or organic acids (French Patent No. 1,603,051) in more or less large amounts so as to ensure the solution of the anionic dyestuff in a homogeneous dyebath based on lipophilic solvent.

In the first two processes, the dyestuff is concentrated throughout the dyeing in the hydrophilic phase, while the lipophilic phase which is by far the largest in quantity remains colourless.

In the last process, it may happen that the dyestuff, distributed over the whole bath, becomes concentrated during the dyeing in a second aqueous phase resulting from the appearance of the water introduced by the reagents or the textile fibre. In order to avoid this phenomenon, which can be a disadvantage in dyeing, a means of solubilising all or part of the conventional anionic dyestuff in the lipophilic phase in which it is normally insoluble has been sought, according to one of the aims of the invention. Such a process would also have the advantage of avoiding the consequences of a breakdown of the emulsion, which is always prejudicial to the good appearance of the dyeing.

In French Pat. No. 1,560,532 of Jan. 29, 1968 relating to a continuous process for dyeing polyamides, the possibility of using conventional anionic dyestuffs or the salts of such dyestuffs with organic bases such as dodecylamine or p-tolylguanidine has been indicated. In French Pat. No. 2,032,391 of Feb. 24, 1970, an identical technique, equally applied to the continuous dyeing of polyamides generalises the use of anionic dyestuffs thus salified by various organic bases. The use of such dyestuffs converted into salts, provided that the organic base has a sufficiently lipophilic character, may also be envisaged for dyeing by exhaustion in the halogenated hydrocarbon solvents. But this implies the need for previously making the salts of the anionic dyestuffs, which is an obvious complication of the process.

It has also been recommended in French Pat. No. 2,019,321 of Aug. 1, 1969 to effect the solution of the anionic dyestuff by salifying by the organic base in situ in the chlorinated hydrocarbon serving as the dyeing medium by exhaustion of the basic fibre. The preparation of such solutions of amine salts of dyestuffs requires the use on the one hand of the free acid form of the anionic dyestuff (which is not always readily accessible) and on the other hand of at least a stoichiometric quantity of organic base in relation to the dyestuff in order to effect its complete solution and obtain a clear solution in the chlorinated hydrocarbon.

According to the present invention it has now been found that the use of the dyestuff in the form of the free acid can be avoided by solubilising conventional anionic dyestuffs, that is to say, in their customary alkali metal salt form, in the lipophilic solvent of the dyebath in which these dyestuffs are normally insoluble. This "liposolubilisation," effected at the very moment of the preparation of the dyebath without having recourse to specifically fat-soluble dyestuffs, has a temporary and reversible character. It may be effected by several operational variants, the principle of which may be outlined as follows:

A solution of an organic, fat-soluble base in a lipophilic solvent is added to a concentrated aqueous or aqueous-alcoholic solution of the anionic dyestuff. On acidification the dyestuff leaves the hydrophilic phase for the lipophilic base where it is solubilised by the organic base. The reaction is not generally complete. It is possible to regulate the distribution of the dyestuff between the hydrophilic and lipophilic phases according to the nature of the reagents and their proportions. It is therefore possible to use quantities of organic base which are less than the stoichiometric amount in relation to the dyestuff.

The anionic dyestuff present in the lipophilic phase is in the form of the undissociated amine salt, thus strictly speaking, lipophilic. An equilibrium exists between the dyestuff associated with the base in the lipophilic solvent and the dissociated dyestuff present in the hydrophilic phase of the dyebath; it is this dissociated form which enables a dyeing of the basic fibres giving better fastness to be carried out.

It is possible to replace the acid and the fat-soluble organic base by the salt resulting from their combination.

It is possible moreover to do away with the addition of acid to the dyebath and to solubilise the anionic dyestuff directly in its usual salt form in the lipophilic phase by means of certain organic bases such as stearyl imidazoline or oleyl imidazoline.

This technique can be advantageously used for the dyeing of basic fibres normally exhausting in an aqueous medium in the region of neutrality.

If it is desired to start the dyeing only in the lipophilic phase, the hydrophilic phase can previously be separated from the coloured lipophilic phase by decantation, siphoning or centrifuging. Then at the end of the dyeing the water intended to constitute the hydrophilic phase can be introduced so as to obtain a complete ionic fixation of the dyestuff on the fibre and the maximum fastness of the dyeing.

Whatever may be the method of dyeing adopted, the lipophilic phase represents from 50 to 99 percent of the whole bath. It preferably comprises between 80 and 98 percent, the remainder consisting of the hydrophilic aqueous phase.

The fat-soluble organic bases which may be used are those containing at least 10 carbon atoms, for example mono- or poly-functional primary, secondary or tertiary amines, which may belong to the aliphatic, cycloaliphatic, aromatic or heterocyclic series.

The acids are preferably those habitually used for dyeing basic fibres, especially formic or acetic acids.

Anionic dyestuffs in general are capable of being used. Among others, may be mentioned acid or direct, metallisable or non-metallisable dyestuffs, complex metalliferous dyestuffs of the 1:1 type, water-soluble complex metalliferous dyestuffs of the 2:1 type, complex metalliferous dyestuffs of the 2:1 type present in dispersed form. They may belong to a great variety of chemical families, such as nitro, azo, anthraquinone, methine, styryl, phthalocyanine or perinone dyestuffs. The anionic fluorescent brightening agents are also applicable in this process.

The proportions of anionic dyestuff, of organic base and of acid are such that 0.1 N to 5 N molar equivalents of the base and 0 to 5 N molar equivalents of the acid correspond to N molar equivalents of the dyestuff, the optimal quantities being near to or less than the stoichiometric amounts with respect to the base and generally greater than the stoichiometric amounts with respect to the acid.

Halogenated hydrocarbons, especially the chlorinated derivatives such as methylene chloride, di- and tri-chloroethanes, trichloroethylene and perchloroethylene are preferably used as lipophilic solvents.

The constituents of the hydrophilic phase entering principally into account are water and possibly alcohols containing up to 4 carbon atoms miscible with water, such as methanol, ethanol or isopropanol or mixtures thereof. The presence of an alcohol containing up to 4 carbon atoms in the dyebath also allows a more rapid fixation of the dyestuff.

The basic fibres capable of being dyed by the process according to the invention are the natural polyamide fibres such as wool or silk, fibres used on synthetic polyamides such as polyamides 6, 6—6 and 11, or the basified synthetic fibres. These fibres may be dyed in all their forms such as: flock, rovings or slivers, yarn, fabric, knitted material or non-woven materials.

With a view to dyeing, the fibres are treated with the emulsions according to the invention is an open bath, while progressively raising the temperature of the bath until it is exhausted, the lipophilic phase giving its dyestuff to the hydrophilic phase. Complete exhaustion is generally obtained towards 100°C. If the dyeing has been effected in the absence of water, the small quantity of water intended to make up the hydrophilic phase is added at the end of the dyeing. The shades obtained are even and without bars. The fibres, especially wool, have a most pleasant handle.

In the following examples, which are purely illustrative, the parts are parts by weight unless the contrary is mentioned. The anionic dyestuffs, indicated by the number by which they are denoted in the Colour Index, are taken in their salt, undiluted form. Examples 1 to 8

Example 1 . . . 0.6 parts of C.I. Acid Yellow 25, C.I. 18835;

Example 2 . . . 0.5 parts of C.I. Acid Orange 3, C.I. 10385;

Example 3 . . . 0.55 parts of C.I. Acid Red 57;

Example 4 . . . 0.45 parts of C.I. Acid Blue 47, C.I. 68085;

Example 5 . . . 0.5 parts of C.I. Acid Blue 40, C.I. 62125;

Example 6 . . . 0.45 parts of C.I. Acid Blue 62, C.I. 62045;

Example 7 . . . 0.45 parts of C.I. Acid Blue 25, C.I. 62055;

Example 8 . . . 0.45 parts of C.I. Acid Blue 129 (the sodium salt of 2',4',6'-trimethyl-4-phenylamino-1-amino anthraquinone-2-sulphonic acid)

are respectively dissolved in 100 parts of water and these 8 coloured solutions were poured into 8 baths all having the following composition:

| | |
|---|---|
| perchloroethylene | 800 parts |
| aqueous 0.7% solution of octadecylamine acetate | 100 parts |

After stirring, these 8 baths were each used to dye 50 parts of 6–6 polyamide in the form of yarn. The temperature was raised progressively from 60°C. to 100°C. in half an hour and the samples were then dyed for half an hour at this temperature, and then allowed to cool. The exhaustion of the baths was almost complete. After rinsing and drying the fibres bright, even and shades which were fast to wet tests were obtained. Example 9

0.66 parts of C.I. Acid Orange 3, C.I. 10385;
0.25 parts of C.I. Acid Red 57;
0.09 parts of C.I. Acid Blue 47, C.I. 62085 were dissolved in 25 parts of water. This coloured solution was poured into 975 parts of perchloroethylene in which 0.7 parts of octadecylamine had been previously dissolved. The addition of 0.5 parts of acetic acid ensured the transfer of the dyestuffs into the perchloroethylene.

The bath thus prepared was introduced into an apparatus with circulation of the bath, charged by rolling up on a roller 100 parts of a polyamide 6—6 cloth. The temperature was raised progressively to 100°C. at the rate of one degree per minute. After half an hour at 100°C. the bath was completely exhausted. A cloth dyed in a very even khaki shade was thus obtained.

EXAMPLE 10

0.5 parts of the dyestuff C.I. Acid Red 57 were dissolved in 80 parts of water. This solution was poured into 920 parts of perchloroethylene containing 0.2 parts of octadecylamine. By the addition of 0.1 parts of 80 percent formic acid and stirring, the major part of the dyestuff passed into the perchloroethylene where the aqueous phase was emulsified. Then this bath was drawn at the ambient temperature through 50 parts of nylon 6—6 (continuous thread for carpet). Then the temperature was progressively raised to 70°C. (1° per minute), then more slowly (1° per 2 minutes) up to about 100°C. This temperature was maintained for a quarter of an hour. The bath was almost completely exhausted. The bath was cooled and emptied, and the fibres were drained and dried.

A bright and full-bodied bluish red shade was obtained; this shade was perfectly even and had the usual fastness to wet tests of the dyestuff.

The bath is either purified by a rapid distillation or used again in order to produce the same shade by effecting the necessary further supply of dyestuff, acid and amine.

EXAMPLE 11

0.2 parts of undiluted C.I. Acid Red 57 was dissolved in 25 parts of water. This solution was poured into an autoclave apparatus providing circulation of the bath, which contained 975 parts of perchloroethylene in which 0.1 parts of octadecylamine had previously been dissolved. Then 0.2 parts of pure formic acid were added and the greater part of the dyestuff dissolved in the perchloroethylene. The circulating pump of the apparatus emulsified instantaneously the bath, which was drawn through a roller on which a wool fabric had been rolled (bath ratio 1:50). The temperature was raised progressively to 90°–100°C. and the fabric was dyed for half an hour at this temperature. The exhaustion of the dye-stuff was practically complete and the shade obtained on the material was bright and well developed.

EXAMPLE 12

Sixty parts of tufted carpet (in short tufts), one-third consisting of an unsized cotton support and the remainder of nylon 6—6, was dyed.

Ten parts of a 10 percent aqueous dispersion of the dyestuff C.I. Acid Yellow 119 (1:2-cobalt complex of 1'-hydroxy-5'-nitro-2-phenylazo-3-hydroxy-N-phenyl butanamide), then 0.5 parts of 80 percent acetic acid were added to 990 parts of perchloro-ethylene in which 0.5 parts of octadecylamine had previously been dissolved.

This bath was drawn in the cold through the material and the temperature was raised to 100°C. at the rate of 1° per minute. The bath was then completely exhausted. After drying, a beautiful even golden yellow colouration which was fast to wet tests was obtained.

EXAMPLES 13 to 26

0.6 parts of octadecylamine were dissolved in 990 parts of perchloroethylene and 0.5 parts of one of the undiluted dyestuffs enumerated below in salt form were dissolved in 10 parts of water.

Example 13 — C.I. Acid Yellow 25, C.I. 18835;
Example 14 — C.I. Acid Yellow 61;
Example 15 — C.I. Acid Yellow 38, C.I. 25135;
Example 16 — C.I. Acid Orange 19, C.I. 14690;
Example 17 — C.I. Acid Red 57;
Example 18 — C.I. Acid Red 115, C.I. 27200;
Example 19 — C.I. Acid Red 114, C.I. 23635;
Example 20 — C.I. Acid Red 225;
Example 21 — C.I. Acid Blue 47, C.I. 62085;
Example 22 — C.I. Acid Blue 129;
Example 23 — C.I. Acid Violet 43, C.I. 60730;
Example 24 — C.I. Acid Green 25, C.I. 61570;
Example 25 — C.I. Acid Black 63;
Example 26 — C.I. Direct Red 81, C.I. 28160.

C.I. Acid Yellow 61 is [2-N-ethyl-N-phenyl-sulphonamido-4-methyl-benzene]- <1 azo 4> -[2',5'-dichloro-4'-sulpho-1-phenyl-3-methyl-5-hydroxy-pyrazole], C.I. Acid Red 225 is the 1:2 -chromium complex of 4'-nitro-2'-hydroxy-4-phenylazo-5-hydroxy-1-phenyl-3-methyl-pyrazole and C.I. Acid Black 63 comprises the 1:2 chromium complexes of 4'-nitro- and 5'-nitro-2'-hydroxy-1-phenylazo-2-hydroxy naphthalenes (50/50).

The two solutions were mixed and then 0.3 parts of pure acetic acid were added. 50 parts of polyamide 6 in the form of threads were dyed in the open bath while heating progressively up to 100°C. then maintaining this temperature for 30 minutes. After rinsing and drying the material, even shades, having the usual fastness to wet tests of the dyestuffs used, were obtained.

EXAMPLES 27 to 39

The following Table summarises other examples of dyeing. In the third and fourth columns the percentages of water and of chlorinated solvent relate to 100 parts of the bath (bath ratio 1/10).

The proportions of amine are given with respect to the weight of fibres, the proportion of acid being 0.3 percent of acetic acid. The dyeing was effected with 1 percent (on the weight of fibres) of the dyestuff C.I. Acid Blue 129 by heating the bath progressively up to 100°C. and maintaining this temperature for half an hour. The baths are correctly exhausted. The shades have the normal fastness.

| Ex. | Fibre | Water | Solvent | Amine |
|---|---|---|---|---|
| 27 | Wool | 20% | $C_2Cl_4$ 80% | Octadecylamine 0.6% |
| 28 | Silk | 10% | $C_2Cl_4$ 90% | Octadecylamine 0.6% |
| 29 | Nylon 6 | 5% | $C_2Cl_4$ 95% | Octadecylamine 0.6% |
| 30 | Nylon 6–6 | 5% | $C_2Cl_4$ 95% | Octadecylamine 0.6% |
| 31 | Rilsan | 5% | $C_2Cl_4$ 95% | Octadecylamine 0.6% |
| 32 | Nylon 6–6 | 5% | $C_2HCl_3$ 95% | Octadecylamine 0.6% |
| 33 | Nylon 6–6 | 5% | $C_2Cl_4$ 95% | Octylamine 0.6% |
| 34 | Nylon 6–6 | 5% | $C_2Cl_4$ 95% | Dodecylamine 0.6% |
| 35 | Nylon 6–6 | 5% | $C_2Cl_4$ 95% | Tetradecylamine 0.6% |
| 36 | Nylon 6–6 | 5% | $C_2Cl_4$ 95% | 9-Octadecene-ylamine 0.7% |
| 37 | Nylon 6–6 | 5% | $C_2Cl_4$ 95% | bis(hexadecyl) amine 1.2% |
| 38 | Nylon 6–6 | 5% | $C_2Cl_4$ 95% | bis(octadecyl) amine 1.2% |
| 39 | Nylon 6–6 | 5% | $C_2Cl_4$ 95% | N,N-dimethyl-octadecylamine 1% |

EXAMPLE 40

950 parts of a solution of 0.1 parts of bis(hexadecyl)-amine in perchloroethylene and 50 parts of a solution of 0.1 parts of anionic fluorescent brightening agent C.I. 15 in water were admixed and 0.05 parts of acetic acid were added to the mixture. 50 parts of nylon 6—6 fibres were introduced and the operation was as in Examples 13 to 26. The polyamide fibre thus treated acquired a brilliant whiteness.

EXAMPLE 41

50 parts of an aqueous solution containing 10 g/litre of C.I. Acid Blue 129 were poured into 950 parts of perchloroethylene in which 0.5 part of bis-(hexadecyl) amine had been previously dissolved. By the addition of 0.5 part of glacial acetic acid, the greater part of the dyestuff was dissolved into the lipophilic phase which was separated from the aqueous phase by decantation. This coloured solution was used to dye 100 parts of 6—6 polyamide fibres. The temperature was raised progressively to 100° C in a period of one hour. At this stage, the bath was almost exhausted. In order to finish the exhaustion and ensure the fixation of the dyestuff, 10 parts of water are then introduced into the apparatus and dyeing was continued for 15 minutes at 100° C. The bath was then cooled and the material was rinsed with perchloroethylene and dried, a bright royal blue and very even shade being obtained.

Another variant in the preparation of the dyebath comprises dissolving the dyestuff in 10 parts of methanol and adding to this solution the amine previously dissolved in 10 parts of perchloro-ethylene. The temperature is raised to 45° C in a period of 5 minutes and the solution is poured through a filter into 980 parts of perchloroethylene. The material is introduced and dyed as above by adding during the dyeing 10 parts of water in order to ensure the complete fixation of the dyestuff.

We claim:

1. Emulsion for dyeing in an open bath by exhaustion comprising a coloured aqueous hydrophilic phase containing water, a mineral acid or an organic acid and one to three anionic dyestuffs in a dissociated state and a coloured lipophilic phase containing the same anionic dyestuffs or dyestuffs associated in the form of a salt, with less than a stoichiometric amount in relation to the dyestuff or dyestuffs of a fat-soluble organic base containing at least ten carbon atoms, selected from the group consisting of saturated and unsaturated monoalkyl amine, dialkyl amine and trialkyl amine, the lipophilic solvent being a halogenated aliphatic hydrocarbon, the lipophilic phase comprising from 80 to 98 percent of the emulsion and the molar ratio of the fat-soluble organic base with respect to the dyestuff being between 0.1 and 5.

* * * * *

UNITED STATES PATENT OFFICE
CERTIFICATE OF CORRECTION

Patent No. 3,807,949　　　　　　　　　Dated April 30, 1974

Inventor(s)　J.M.L. J. D'Albignac and S.E.E. Riassetto

It is certified that error appears in the above-identified patent and that said Letters Patent are hereby corrected as shown below:

Column 1, line 22 after "now abandoned", delete "which application corresponds to French patent No. 2,054,430."

Signed and sealed this 22nd day of October 1974.

(SEAL)
Attest:

McCOY M. GIBSON JR.　　　　　　　　　C. MARSHALL DANN
Attesting Officer　　　　　　　　　　Commissioner of Patents